(No Model.) 3 Sheets—Sheet 1.
A. HARVEY.
FRICTION CLUTCH.
No. 520,109. Patented May 22, 1894.
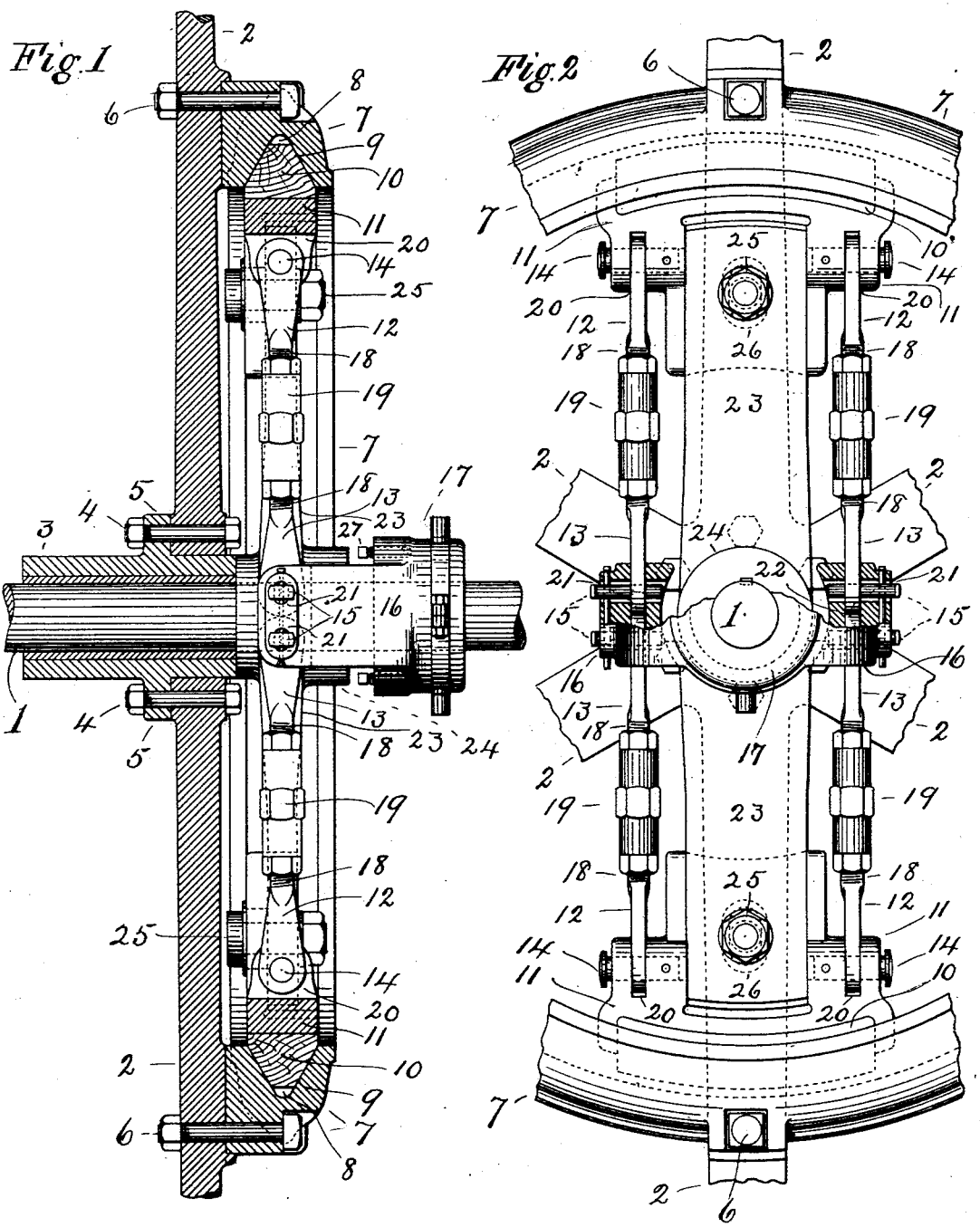
Witnesses
C. H. Hill.
R. Blume.
Inventor
Amasa Harvey.
By his Attorney
P. H. Gunckel.

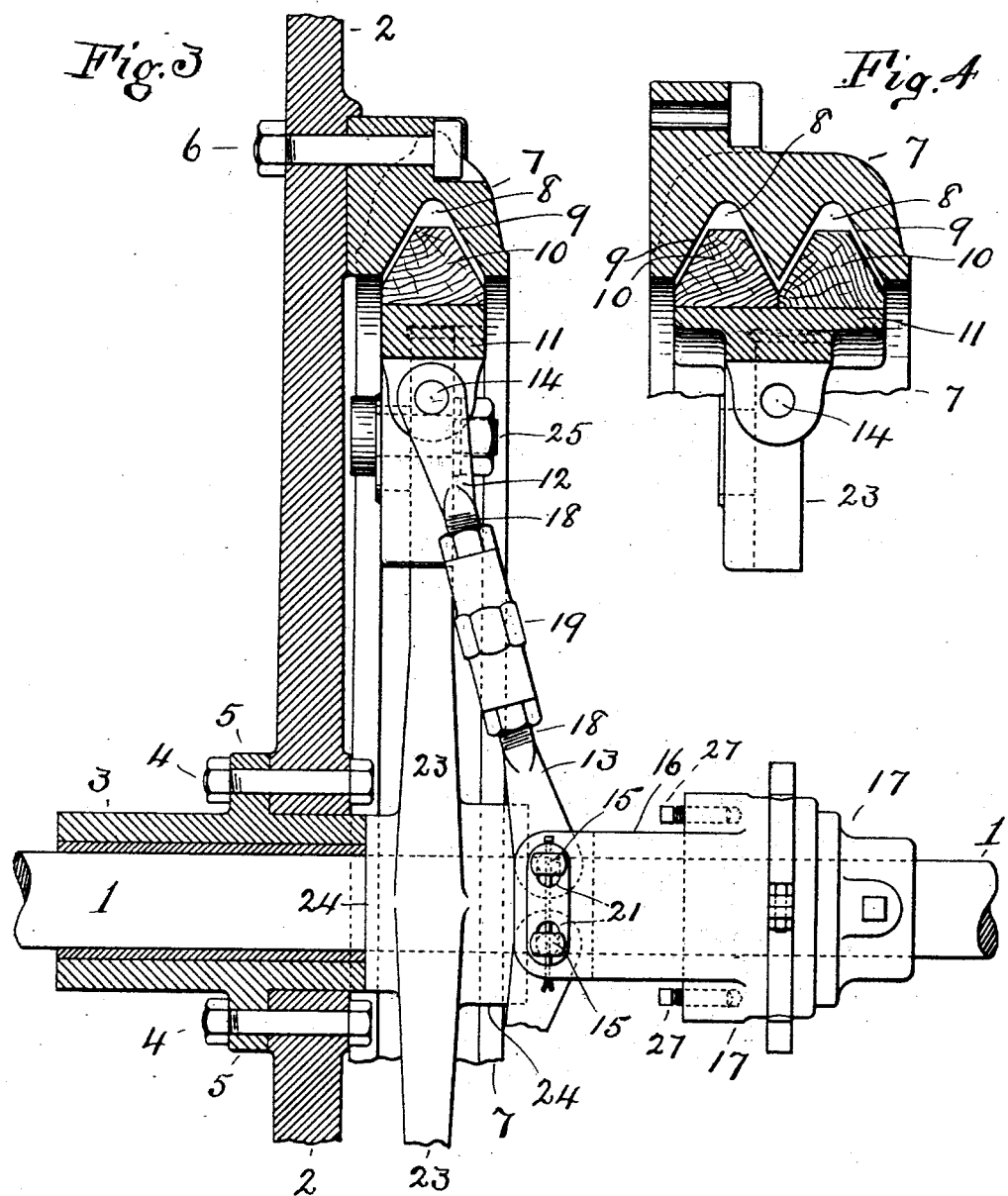

(No Model.) 3 Sheets—Sheet 3.
A. HARVEY.
FRICTION CLUTCH.
No. 520,109. Patented May 22, 1894.
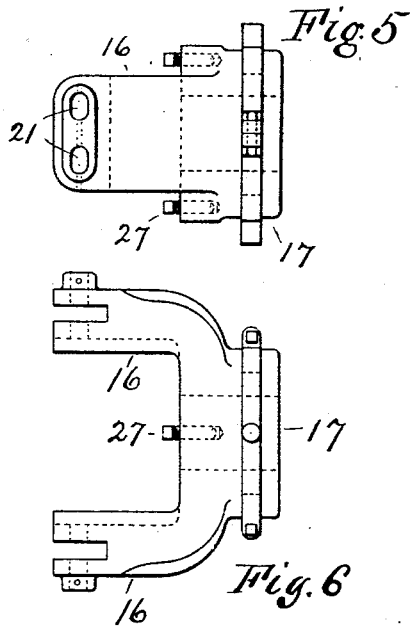
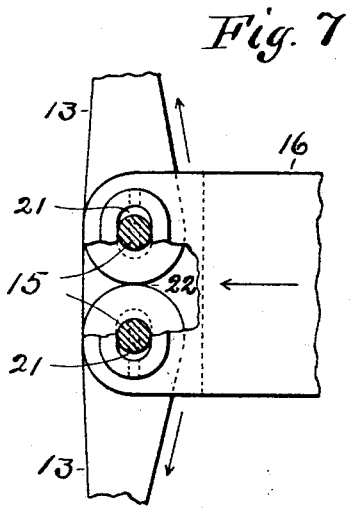
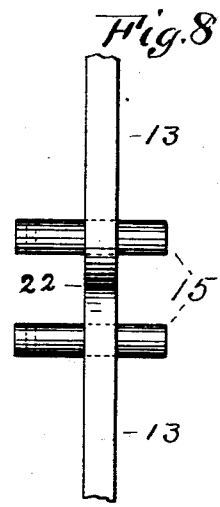
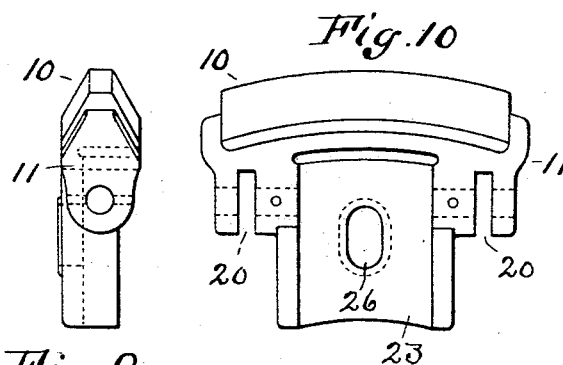
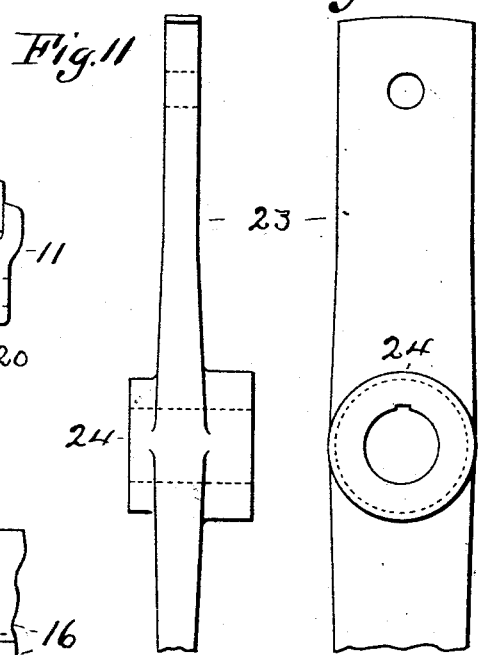
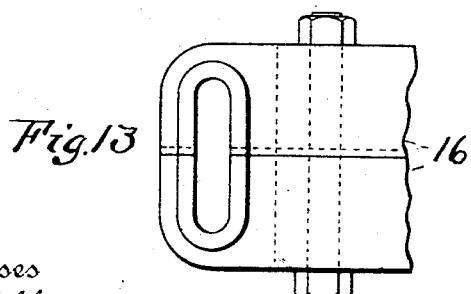
Witnesses
C. H. Hill
R. Blume
Inventor
Amasa Harvey.
By his Attorney
P. H. Gunckel

UNITED STATES PATENT OFFICE.

AMASA HARVEY, OF MINNEAPOLIS, MINNESOTA, ASSIGNOR OF ONE-HALF TO THE TWIN CITY IRON WORKS, OF MINNESOTA.

FRICTION-CLUTCH.

SPECIFICATION forming part of Letters Patent No. 520,109, dated May 22, 1894.

Application filed November 4, 1893. Serial No. 490,057. (No model.)

*To all whom it may concern:*

Be it known that I, AMASA HARVEY, a citizen of the United States, residing at Minneapolis, in the county of Hennepin and State of Minnesota, have invented a certain new and useful Improvement in Friction-Clutches, of which the following is a specification.

My invention relates to mechanisms in which the rotation of member to be driven is controlled by frictional driving devices arranged to be engaged or disengaged at will. The object of the present invention is improvement of the clutching devices, whereby the frictional contact of opposite clutch-shoes is made interdependent.

In the accompanying drawings Figure 1, is a view at right angles to the driving shaft, showing the devices in engaging positions and partly in section and partly in elevation. Fig. 2 is an elevation, viewed from the right of Fig. 1. Fig. 3 is a view similar to Fig. 1, showing the friction devices disengaged. Fig. 4 shows a duplication of the friction-shoes; and Figs. 5 to 13 inclusive, are detail views of parts of the mechanism, to be hereinafter specifically described.

In such drawings 1 designates a driving shaft; 2 spokes of a pulley or other member to be driven; and 3, a loose sleeve on the shaft to which the pulley hub is secured by bolts 4 extending through the hub and a flange 5 on the sleeve. To the spokes is attached, by bolts 6, a ring 7 having an internal annular groove 8, the walls, 9, of which are inclined to provide suitable frictional surfaces for the beveled friction-shoes, 10, arranged to enter the groove at opposite sides of the shaft. These shoes are secured on carriers 11 that are supported by two-part lever-arms, 12 and 13, connected by pivots 14 to the carriers, and by pivots 15 to arms 16 provided on the shifter 17. The two lever members, 12 and 13, have their adjacent ends screw-threaded, as shown at 18, and a turn-buckle 19 connects them and enables them to be adjusted so as to regulate the aggregate length of the lever-arms on opposite sides of the shaft. The portions 12 enter slots 20 in the carriers 11, to which they are connected by the pivots 14; while the portions 13 are connected to the arms 16 by the pivots 15 which pass through oblong slots 21 in the arms, so that the levers may have slight play in direction of their length. The adjustment of the opposite sets of lever-arms, 12 and 13, and of the turn-buckles, should be such that when the shifter is moved inward the inner ends of the arms 13 will abut while the friction-shoes are in working position. These abutting ends are rounded, as shown at 22, so that they may roll on each other as the devices are shifted to and from operative positions. In this way the pressure of the shoes against the ring at opposite sides of the shaft is made self-equalizing and its degree may be regulated as required by operating the turn-buckles. To reinforce these levers and cause them to properly rotate the friction-shoes, arms 23 on a hub 24, that is keyed to the shaft, extend to the shoe-carriers and are secured thereto by bolts 25. These bolts pass through oblong slots 26 in the carriers and so permit the necessary movements, inward and outward, of the carriers while limiting the former movement. The throw of the shifter away from the wheel is thus limited; while its movement toward the wheel is limited by adjustable screws 27 which come in contact with the hub 24 when the lever-arms are at right angles to the shaft. The shifter may be operated by a lever in the usual manner.

If it is desired to increase the friction, the length of the friction-shoes may be made greater, or, preferably, the friction-ring 7 may be made wide enough for two or more grooves adapted to receive a corresponding number of shoes, as indicated in Fig. 4, while other parts remain substantially the same as heretofore described.

Having described my invention, what I claim is—

1. In a friction clutch, the combination with a ring providing an internal frictional surface, and friction shoes arranged diametrically opposite; of pivoted levers for moving the shoes to and from engagement and arranged to have their inner ends abut without thrusting upon their pivots when in position to cause engagement of the shoes with the friction surfaces, substantially as set forth.

2. In a friction clutch, the combination with opposite radially movable shoes and a circular frictional surface; of radially arranged levers having loose pivotal connections with a shifting device, whereby their ends may be thrust to contact, substantially as and for the purpose set forth.

3. In a friction clutch, the combination with a ring having an internal annular groove; of friction-shoes; levers for operating them, the levers having their inner ends arranged to abut; a shifter having arms to which the inner ends of the levers are pivoted in slots permitting longitudinal movement of the levers; and arms extending from a hub on the shaft and attached to the shoe carriers for causing them to rotate with the ring, substantially as set forth.

AMASA HARVEY.

Witnesses:
P. H. GUNCKEL,
R. BLUME.